(12) United States Patent
Pedersen

(10) Patent No.: US 7,395,066 B2
(45) Date of Patent: Jul. 1, 2008

(54) METHOD, SYSTEM AND DEVICE FOR IMPROVING PERFORMANCE DURING CELL CHANGE

(75) Inventor: Klaus Ingemann Pedersen, Aalborg (DK)

(73) Assignee: Nokia Corporation, Espoo (FI)

( * ) Notice: Subject to any disclaimer, the term of this patent is extended or adjusted under 35 U.S.C. 154(b) by 130 days.

(21) Appl. No.: 11/213,827

(22) Filed: Aug. 30, 2005

(65) Prior Publication Data

US 2006/0286985 A1 Dec. 21, 2006

(30) Foreign Application Priority Data

Jun. 15, 2005 (EP) ................... 05012912

(51) Int. Cl.
*H04Q 7/20* (2006.01)
(52) U.S. Cl. .................. 455/436; 455/445; 455/442; 455/432.1; 455/434; 455/443; 455/446; 370/331; 370/208; 370/236; 370/237; 370/328; 370/341
(58) Field of Classification Search ............... 455/445, 455/436, 442, 432.1, 434, 443, 448; 370/331, 370/208, 235, 237, 328, 341
See application file for complete search history.

(56) References Cited

U.S. PATENT DOCUMENTS

| 6,414,947 | B1 * | 7/2002 | Legg et al. ............... 370/331 |
| 7,079,856 | B2 * | 7/2006 | Khan ...................... 455/517 |
| 2003/0232621 | A1 * | 12/2003 | Brooks ...................... 455/424 |

(Continued)

FOREIGN PATENT DOCUMENTS

EP 1 432 262 A1 6/2004

(Continued)

OTHER PUBLICATIONS

3GPP TS 25.433 v6.8.0 (Dec. 2005), "3RD *Generation Partnership Project; Technical Specification Group Radio Access Network; UTRAN Iub Interface Node B Application Part (NBAP) Signalling (Release 6)*", pp. 1-747.

(Continued)

*Primary Examiner*—Rafael Pérez-Gutiérrez
*Assistant Examiner*—Nimesh Patel
(74) *Attorney, Agent, or Firm*—Squire, Sanders & Dempsey L.L.P.

(57) ABSTRACT

The invention discloses a communication system, method and devices for controlling transmission of packets to a user equipment during cell change. The communication system is configured so that data to be transmitted to the user equipment are first transmitted, e.g. from a network controller, to a serving cell and then transmitted from a data buffer of the serving cell to the user equipment. After having performed a cell change from the serving cell to the target cell, the data are transmitted from the target cell to the user equipment. The system, method and devices are adapted to reduce the amount of data in the data buffer in response to a decision of performing a cell change from the serving cell to the target cell. The reduction of the amount of data in the data buffer can be achieved e.g. by reducing the data flow from the network controller to the serving cell, and/or by increasing the data flow from the data buffer to the user equipment.

28 Claims, 3 Drawing Sheets

U.S. PATENT DOCUMENTS

2005/0090259 A1* 4/2005 Jain et al. .................... 455/439
2005/0136844 A1* 6/2005 Giesberts et al. ......... 455/67.13
2005/0233709 A1* 10/2005 Gardner et al. .............. 455/101
2006/0140152 A1* 6/2006 Wang et al. ................. 370/331

FOREIGN PATENT DOCUMENTS

EP    1432262 A1 * 6/2004
WO    WO 02/058248 A2   7/2002

OTHER PUBLICATIONS

A. H. Holma, "WCDMA for UMTS—Radio Access for Third Generation Mobile Communications", 2004, pp. 293-304, John Wiley and Sons, Third Edition.

3GPP TR 25.877 V5.1.0, "*3$^{RD}$ Generation Partnership Project; Technical Specification Group Radio Access Network; High Speed Downlink Packet Access: Iub/Iur Protocol Aspects (Release 5)*" XP-002236315, Jun. 2002, pp. 1-49.

ETSI TS 125 308 V6.2.0, "*Universal Moile Telecommunications System (UMTS); UTRA High Speed Downlink Packet Access (HSDPA); Overall description; Stage 2 (3GPP TS 25.308 version 6.2.0 Release 6)*" Sep. 2004, pp. 1-30.

International Search Report PCT/IB2006/051910, filing date Jun. 14, 2006.

* cited by examiner

METHOD, SYSTEM AND DEVICE FOR IMPROVING PERFORMANCE DURING CELL CHANGE

The present invention relates to a method, system and device for improving performance during cell change. Generally but not exclusively, the invention is related to HSDPA, high speed downlink packet access, in WCDMA, wideband code division multiple access.

When a user equipment such as a HSDPA user equipment is currently connected with a serving cell (denoted source cell) such as a serving HS-DSCH cell and is about to make a handover to a new target (denoted target cell) of a communication system or radio access network, RAN, a problem of packet loss may occur. The packet loss such as HSDPA packet loss may arise during the cell change such as HS-DSCH cell change (which is equivalent to HSDPA handover; HS-DSCH stands for high speed downlink shared channel). Usually, a serving radio network controller, RNC, decides when and whether such a change of the serving HS-DSCH cell to another target cell should be made. A potential problem with such a change of the serving HS-DSCH cell is that there might be buffered data in the source cell at the time instant where the cell change is made. These data are therefore deleted from the source cell, which means that they are either permanently lost, or have to be recovered by higher layer retransmissions such as RLC retransmissions or TCP retransmissions.

For streaming services using UDP, user datagram protocol, and RLC, radio link control, unacknowledged mode, the data that are deleted from the source cell at the time of making the HS-DSCH cell change are lost, since no higher layer retransmission mechanisms are available for these services. In other cases, when higher layer retransmission mechanisms are available, resources are occupied and workload is increased for recovering the data deleted from the source cell, using the higher layer retransmissions.

The present invention provides a system and method in accordance with the independent system or method claims, or any one of the dependent claims.

Further, devices are provided in accordance with the device claims.

The invention improves the performance for users such as HSDPA-users subject to cell change (handover). The invention aims at reducing packet loss or packet handling workload during cell change such as HS-DSCH, high speed downlink shared channel, cell change. The invention can be applied e.g. in systems and methods according to 3GPP specifications.

The invention is adapted to reduce the amount of data in the data buffer of the serving cell in response to a decision of performing a cell change from the serving cell to the target cell. The reduction of the amount of data in the data buffer can be achieved e.g. by reducing the data flow from the network controller to the serving cell, and/or by increasing the data flow from the data buffer to the user equipment.

The present invention is able to reduce, minimise, or avoid packet loss or need of packet retransmission during cell change such as HS-DSCH cell change. The quality and speed of the transmission can be improved. The invention improves the performance of data services (including streaming) transmitted e.g. over HSDPA on WCDMA. The invention further improves the performance for users that move from one cell to another cell.

In the following, the invention will be described in more detail with reference to the drawings.

DESCRIPTION OF EMBODIMENTS OF THE INVENTION

Figure 1:
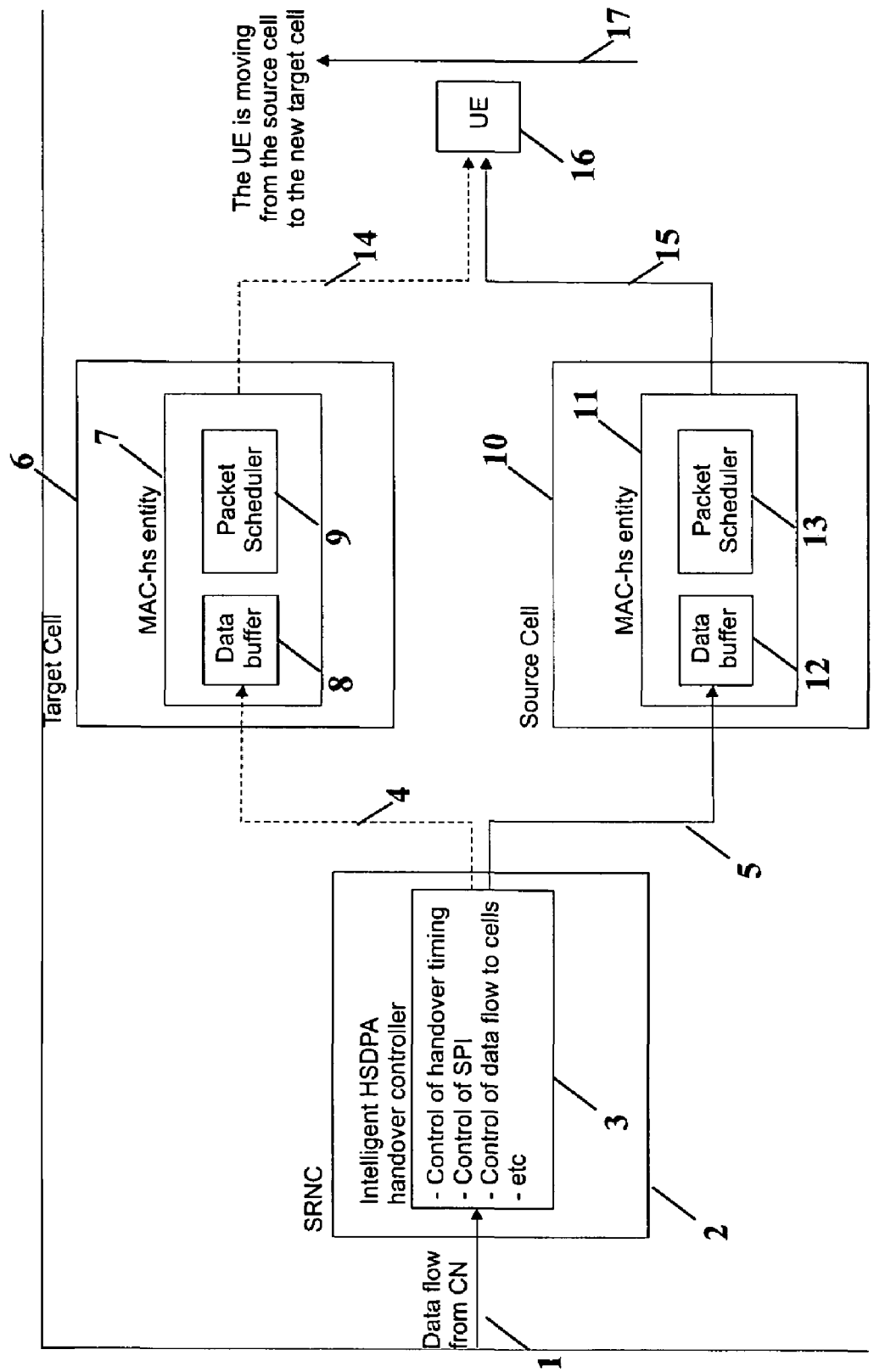
FIG. 1 illustrates the structure of an embodiment of the invention.

FIG. 1 illustrates the structure of a system and device according to an embodiment of the invention. A radio network controller such as a serving radio network controller, SRNC, 2 forms part of a radio access network, RAN, which represents or is part of a communication system for providing speech, data, and/or other services for users of the communication system. The radio network controller 2 receives and transmits data intended for users, e.g. for a user equipment 16, or for the communication system from and to a core network, CN, via a path 1. The SRNC 2 includes a controller or control means 3 which may be implemented as a handover controller, preferably an intelligent HSDPA handover controller. The control means 3 includes means and functions for performing at least one a control of handover timing, a control of scheduling priority indicator, SPI, a control of data flows to cells, etc.

The SRNC 2 transmits data to be sent to a user equipment, UE, 16 to a source cell 10 actually serving the UE 16, via a path 5. The source cell 10 includes a scheduler 11 such as a MAC-hs, Medium Access Control high speed, entity which comprises a data buffer 12 and a packet scheduler 13. Packets are sent to the UE 16 via a path 15. The path 15 usually is a radio link which normally includes an air interface. Data to be sent to the UE 16 are buffered in the data buffer 12, and transferred, as packets or PDUs, packet data units, to path 15 under control of the packet scheduler 12. The packet scheduler 12 determines the time points of sending the data from buffer 12 to path 15. The data in the buffer 12 are usually stored as packets or PDUs.

When the UE 16 is moving e.g. along a direction 17 to a coverage area of another cell 6, the controller 3 may decide on a handover of the UE 16 from the source cell 10 to the other cell 6 which will thus become the target cell. The handover decision may also be based on other or additional criteria such as services offered by the cells, available free transmission capacity, power, QoS provided, etc.

As a result of a handover to cell 6, the SRNC 2 will transmit data to be sent to the user equipment, UE, 16 to the target cell 6 now serving the UE 16, via a path 4. Thus, the target cell 6 will now become the source cell. Similar to the source cell 10, the target cell 6 includes a scheduler 7 such as a MAC-hs, Medium access control high speed, entity. The scheduler 7 comprises a data buffer 8 and a packet scheduler 9. Packets are sent to the UE 16 via a radio link or path 14 which normally includes an air interface. Data to be sent to the UE 16 are buffered in the data buffer 8, and transferred, as packets or PDUs to path 14 under control of the packet scheduler 9. The packet scheduler 9 determines the time points of sending the data from buffer 8 to path 14 as packets or PDUs.

In accordance with a preferred implementation of the invention, when a cell change or handover is about to take place, at least one of the serving radio network controller 2 or the cell, e.g. cell 10, actually used for transmission to the UE 16 is adapted or implemented so as to reduce the amount of data stored in the data buffer, e.g. 12, of the cell actually used for transmission to the UE 16. This feature contributes to reducing or minimising the data loss possibly occurring at cell change, and/or minimising the amount of necessary retransmission of data packets after cell change.

For achieving this effect, e.g. one or more of the following methods can be used for controlling or reducing the amount of buffered data in the source cell at the time where the cell change, e.g. HS-DSCH cell change, takes place.

Figure 2:
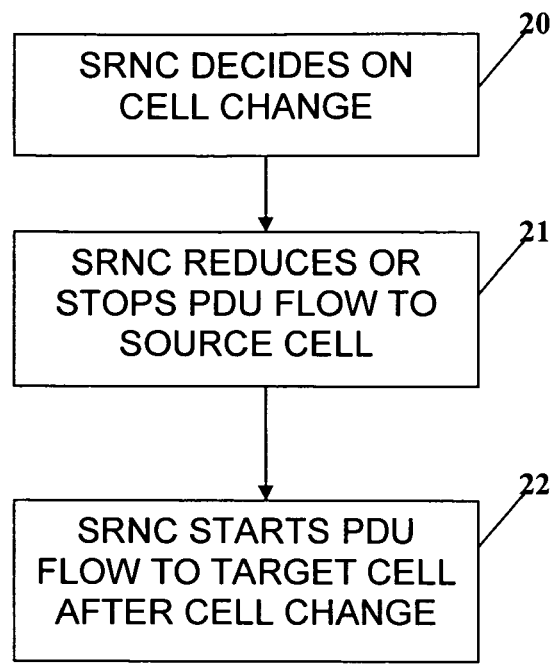
FIG. 2 shows a method in accordance with an embodiment of the invention.

According to a first implementation of a method in accordance with the invention as illustrated in FIG. 2, the SRNC 2 starts to reduce the PDU flow from the SRNC 2 to the serving HS-DSCH source cell 10 at the time instant where it is decided to make, e.g. some hundreds of milliseconds later, a synchronized HS-DSCH cell change. The SRNC 2 can also completely stop to forward PDUs to the source cell 10. The latter alternative of completely stopping the PDU flow to the cell 10 may potentially cause a gap in the transmission to the UE 16 in case the data buffer 12 in the source cell 10 should become empty before the HS-DSCH cell change is made.

As shown in FIG. 2, in a step 20, the SRNC 2 decides on cell change. In a step 21, the SRNC 2 reduces or stops PDU flow to the source cell 10. In a step 22, the SRNC 2 starts PDU flow to the target cell 6 after cell change.

According to this implementation, a method and communication system are provided for controlling transmission of packets to a user equipment during cell change. The communication system comprises the network controller. Data to be transmitted to the user equipment are first transmitted, from the network controller, to the serving cell and then transmitted from the serving cell to the user equipment. When the network controller or another network element has decided to perform a cell change from the serving cell to the target cell, the cell change is executed so as to transmit, after the cell change, the data from the target cell to the user equipment. In response to the decision of performing the cell change from the serving cell to a target cell, the transmission of data from the network controller to the serving cell is reduced or stopped already before making, that is executing, the cell change. This reduction or stopping of data flow to the serving cell is thus performed earlier than in the known prior art where the data flow to the serving cell was stopped only when making the cell change.

The network controller 2 normally, when no cell change takes place, decides in a customary manner on an allowable flow of transmitting data to the serving cell in dependence on information fed back from the serving cell. Preferably, the network controller 2 is configured to reduce, in response to the decision of performing the cell change, the flow of data to the serving cell below the allowable flow, the reduction also including a immediate complete stop of the flow of data to the serving cell.

The amount of data buffered in the data buffer 12 for transmission to the user equipment can thus be reduced effectively and rapidly before starting the cell change or at least before clearing the data buffer during cell change.

According to this implementation of the invention, the network controller 2 is provided for use in a communication system controlling transmission of packets to a user equipment during cell change from a serving cell to a target cell. The network controller is configured to reduce or stop, in response to a decision of performing the cell change from the serving cell to the target cell, the transmission of data to the serving cell already before execution of the cell change.

The network controller 2 may be adapted to decide on an allowable flow of transmitting data to the serving cell 10 in dependence on information feedback from the serving cell 10, and, in response to the decision of performing the cell change, to reduce the flow of data to the serving cell 10 below the allowable flow.

In the following, details of an embodiment incorporating this implementation will be described. Under normal operating conditions, the MAC-hs flow control (FC) of the entity 11 of the serving source cell 10 sends credits to the RNC 2. The number of credits corresponds to the number of packets such as PDU's that the RNC 2 is allowed to forward to the serving cell 10 in the next HS-DSCH interval (typically set to 10 ms). If there are enough buffered data in the RNC 2, then the RNC 2 normally simply forwards the number of PDUs to the serving cell 10 that the MAC-hs FC of entity 11 has asked for, i.e. according to the number of credits.

According to the above described embodiment of the invention, the flow of data from the RNC 2 to the serving cell 10 is reduced before a handover is to take place. An example of such a "reduced flow of data" before a handover is to take place is the following. Instead of forwarding to the serving cell 10 the number of PDUs according to the granted credits (i.e. the number of PDUs the MAC-hs FC of entity 11 of the serving cell 10 has asked for), the RNC 2 forwards only a smaller number of PDUs as it knows that a cell change is about to happen. The RNC 2 may determine the smaller number to be a fraction or part, e.g. 10% to 90%, preferably 30% to 70%, or more preferably about 30%, 40%, or 50%, of the number of PDUs the MAC-hs FC of entity 11 of the serving cell 10 has asked for. Hence, by doing this, the RNC 2 contributes to draining the Node-B data buffer 12 so there is less likelihood that the source cell 10 contains buffered data at the time instant where the serving cell change is made, or at least the total number of data buffered in the data buffer 12 at hand-over is reduced.

Figure 3:
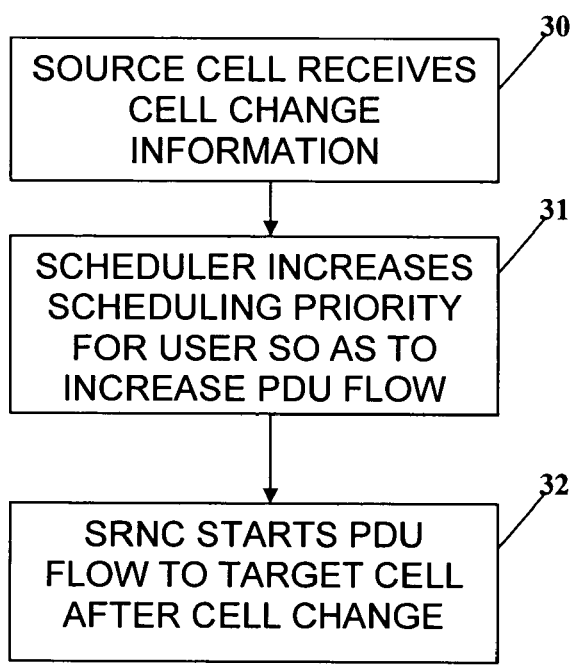
FIG. 3 illustrates a further embodiment of a method in accordance with the invention.

According to another implementation of a method of the invention as illustrated in FIG. 3, at the time instant where the source cell 10 receives a message informing the source cell on an imminent cell change, e.g. a radio link reconfiguration prepare message such as "NBAP: synchronized radio link reconfiguration prepare" message, which indicates that a HS-DSCH cell change is about to take place, then the scheduler 13 of the MAC-hs entity 11 can start to increase scheduling priority for the UE 16, that is give higher scheduling priority to the UE 16 and to the HSDPA-user of UE 16, so that the amount of buffered data, e.g. PDUs in the buffer 12 of the source cell 10, that is in the Node-B or base station associated to cell 10, is quickly reduced. At the same time, the MAC-hs flow control will preferably be frozen for that HSDPA-user so that the number of credits is not increased.

As shown in FIG. 3, in a step 30, the source cell 10 receives cell change information. In a step 31, the scheduler 13 increases scheduling priority for the user of UE 16 so as to increase PDU flow from buffer 12 to UE 16. In a step 32, the SRNC 3 starts PDU flow to the target cell 6 after cell change.

Regarding this embodiment of FIG. 3, when the source cell 10 receives the radio link reconfiguration prepare message, or any other message indicating an imminent cell change or handover, the source cell 10 or the MAC-hs scheduler 13 thereof starts to give higher scheduling priority to that HSDPA-user which is to be handed over. The MAC-hs packet scheduler (PS) 13 in the Node-B or source cell 10 basically selects the user to be scheduled in the next TTI. When there are multiple users allocated the cell, the MAC-hs PS 13 typically tries be fair, in the sense that each user is scheduled occasionally so that a reasonable throughput is provided to each user.

However, when the source cell 10 receives information on a cell change to take place, the MAC-hs PS 13 of this embodiment is implemented to schedule all Handover (HO) candidates, i.e. users that are about to experience a serving HS-DSCH cell change, before considering to schedule other users. By doing this, the MAC-hs PS 13 minimizes the probability of having buffered data in the Node-B or source cell 10 for handover users when the serving HS-DSCH cell change is made. The MAC-hs PS 13 can take this or similar actions when it receives a message such as "radio link reconfiguration prepare message" that indicates that a serving cell change is about to happen for a particular user.

Figure 4:
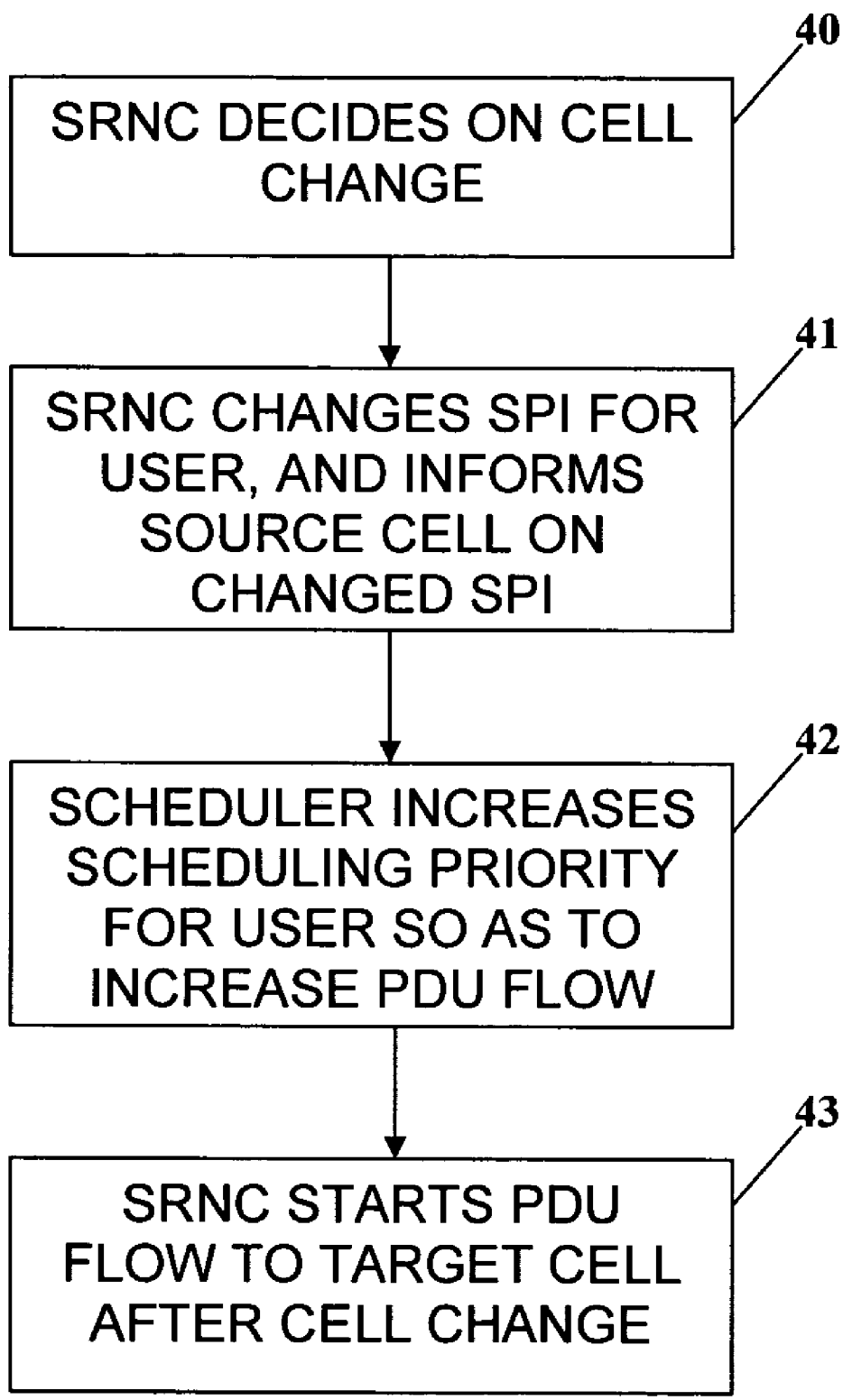
FIG. 4 shows another method in accordance with another embodiment of the invention.

According to another implementation of a method of the invention as illustrated in FIG. 4, the SRNC 2 changes a scheduling priority indicator, SPI, to a pre-determined value for HSDPA-users that are about to experience a HS-DSCH cell change. This corresponds to reserving a SPI value for handover candidates. When receiving the SPI having the pre-determined value, the MAC-hs scheduler 13 knows that HSDPA-users at this particular SPI value should be given higher scheduling priority. The scheduler 13 increases the scheduling priority for the handover candidate upon receipt of the particular SPI value.

As shown in FIG. 4, in a step 40, the SRNC 2 decides on cell change. In a step 41, the SRNC 2 changes the SPI for the user of UE 16 to the pre-determined value, and informs the source cell 10 on the changed SPI. When receiving the changed SPI for the user of UE 16, the source cell 10 checks the SPI and detects, from the pre-determined value of the SPI, that the UE 16 is a handover candidate. In a step 42, the source cell, preferably the scheduler 13 thereof, responds to the changed SPI by increasing the scheduling priority for the user of UE 16 so as to increase the rate of PDU flow from buffer 12 to UE 16. In a step 43, the SRNC 3 starts PDU flow to the target cell 6 after cell change.

Regarding this embodiment, the SRNC2 changes the SPI to a pre-determined value. The MAC-hs packet scheduler (PS) 13 in the Node-B (source cell 10) basically selects the user to be scheduled in the next TTI. As mentioned above, the MAC-hs PS 13 normally tries to be fair so that each of multiple users is scheduled occasionally for reasonable throughput. The RNC 2 can partly control the fairness of the MAC-hs PS 13 by assigning different SPI-values to the different data flows (i.e. different users). Typically, a high SPI values means that a user should be given higher priority, i.e. be scheduled more often so as to receive PDUs with higher frequency compared to other users. In this embodiment, a predefined SPI-value is reserved for all Handover (HO) candidates, i.e. for users that are about to experience a serving HS-DSCH cell change. As both the RNC 2 and MAC-hs PS 13 knows this particular SPI-value for HO candidates, the MAC-hs PS 13 schedules users that have this SPI value before considering to schedule other users. By doing this, the MAC-hs PS 13 minimizes the probability of having buffered data in the Node-B for handover users when the serving HS-DSCH cell change is made.

The implementations of the methods and systems according to FIGS. 3, 4 correspond to a control of the transmission of packets to the user equipment during cell change in such a manner that the serving cell increases, in response to receipt of information informing the serving cell on an intended cell change, the data rate of sending data from the source cell to the user equipment. The implementations of FIG. 3 or 4 can be provided in combination with, or separate from, the implementation according to FIG. 2.

The serving cell may increase a scheduling priority for the user equipment subject to the imminent cell change so as to increase the data rate of sending data to the user equipment, in response to receipt, e.g. from the network controller, of information informing the serving cell on an intended cell change.

According to FIG. 4, the information informing the serving cell on an intended cell change preferably is a scheduling priority indicator having a predetermined value.

The network controller 2 can thus additionally or alternatively be implemented so as to send, to the serving cell 10, information informing the serving cell on an intended cell change, the network controller 2 being e.g. configured to generate, as the information, a scheduling priority indicator having a predetermined value reserved for indicating a cell change.

The serving cell 10 is preferably configured to increase, in response to receipt of information informing the serving cell on an intended cell change, the data rate of sending data to the user equipment. The serving cell may also be adapted to increase a scheduling priority for the user equipment subject to the imminent cell change so as to increase, in response to receipt of the information informing the serving cell on an intended cell change, the data rate of sending data to the user equipment.

The method and system can be performed in, or correspond to, a radio access network, RAN.

The methods mentioned above can be implemented in software in the RNC and/or Node-B, e.g. in the SRNC and/or the MAC-hs entities in the cells, e.g. 10 or 6, of the Node-B.

The invention therefore also encompasses a computer program product including a program for a processing device, comprising software code portions for performing the steps or functions as defined above when the program is run on the processing device of the respective devices such as network controllers or serving cells. The computer program product may comprise a computer-readable medium on which the software code portions are stored. The program may be directly loadable into an internal memory of the processing device. The computer program product may include a program for a network controller as defined above or in the claims, or for a serving cell as defined above or in the claims. The computer program product may include software code portions for performing, when the program is run on the respective device, the functions defined above or in the claims.

Although specific embodiments have been described above, the invention is not limited to the above features but also encompasses any deviations, additions, deletions, and changes of features.

The invention claimed is:

1. A method comprising:
   receiving data, to be transmitted to a user equipment in a communication system comprising a network controller, at a serving cell first, and then transmitting the data from the serving cell to the user equipment;
   executing a cell change so as to transmit, after the cell change, the data from a target cell to the user equipment after a decision of performing the cell change from the serving cell to the target cell; and
   increasing, by the serving cell, in response to receipt of information informing the serving cell on an intended cell change, a data rate of sending the data to the user equipment,
   wherein the serving cell increases a scheduling priority for the user equipment which is subject to an imminent cell change, so as to increase, in response to receipt of information informing the serving cell on the intended cell change, the data rate of sending the data to the user equipment, wherein the information informing the serving cell on the intended cell change is a scheduling priority indicator having a predetermined value, wherein a change of said scheduling priority indicator to the predetermined value corresponds to reserving a scheduling priority indicator value for handover candidates, the scheduling priority for a handover candidate being increased upon receipt of the scheduling priority indicator having the predetermined value.

2. A method according to claim 1, in a communication system comprising a network controller, the method comprising:

reducing or stopping the transmitting of the data to the serving cell, before execution of the cell change, in response to the decision of performing the cell change from the serving cell to the target cell.

3. The method according to claim 2, wherein the network controller decides, or is informed, on an allowable flow of transmitting data to the serving cell, and, in response to the decision of performing the cell change, reduces a flow of data to the serving cell below the allowable flow.

4. The method according to claim 2, wherein the serving cell informs the network controller on an allowable number of packets to be sent to the serving cell in a next interval, and wherein the network controller, in response to the decision of performing the cell change, reduces a number of packets sent to the serving cell in the next interval below the allowable number of packets.

5. The method according to claim 2, wherein the serving cell includes a data buffer for storing the data to be transmitted to the user equipment.

6. The method according to claim 1, wherein the network controller sends the information informing the serving cell on the intended cell change.

7. The method according to claim 1, wherein the information informing the serving cell on the intended cell change is a radio link reconfiguration prepare message.

8. The method according to claim 1, wherein the method is performed in a radio access network.

9. A system comprising:
a network controller;
a serving cell; and
a target cell;
wherein the system is configured such that data to be transmitted to a user equipment during cell change are first transmitted to a serving cell and then transmitted from the serving cell to the user equipment,
wherein the system is further configured to perform a cell change from the serving cell to the target cell so as to transmit, after the cell change, the data from the target cell to the user equipment,
wherein the system is configured to send, to the serving cell, information informing the serving cell on an intended cell change,
wherein the serving cell is configured to increase, in response to receipt of the information informing the serving cell on an intended cell change, a data rate of sending the data to the user equipment,
wherein the serving cell is configured to increase a scheduling priority for the user equipment which is subject to an imminent cell change so as to increase, in response to receipt of the information informing the serving cell on the intended cell change, the data rate of sending the data to the user equipment,
wherein the information informing the serving cell on the intended cell change is a scheduling priority indicator having a predetermined value, wherein the change of said scheduling priority indicator to the predetermined value corresponds to reserving a scheduling priority indicator value for handover candidates, the scheduling priority for a handover candidate being increased upon receipt of the scheduling priority indicator having the predetermined value.

10. The system according to claim 9, wherein the system is configured to reduce or stop, in response to a decision of performing the cell change from the serving cell to the target cell, the transmitting of the data to the serving cell before execution of the cell change.

11. The system according to claim 10, wherein the network controller is configured to decide, or be informed, on an allowable flow of transmitting data to the serving cell, based on information fed back from the serving cell, and, in response to the decision of performing the cell change, to reduce a flow of the data to the serving cell below the allowable flow.

12. The system according to claim 10, wherein the serving cell is configured to inform the network controller on an allowable number of packets to be sent to the serving cell in a next interval, and wherein the network controller is configured to reduce, in response to the decision of performing the cell change, a number of packets sent to the serving cell in the next interval below the allowable number of packets.

13. The system according to claim 10, wherein the serving cell includes a data buffer configured to store the data to be transmitted to the user equipment.

14. The system according to claim 9, wherein the network controller is configured to send the information informing the serving cell on the intended cell change.

15. The system according to claim 9, wherein the information informing the serving cell on the intended cell change is a radio link reconfiguration prepare message.

16. The system according to claim 9, wherein the system is a radio access network.

17. An apparatus comprising:
a reducer configured to reduce or stop, in response to a decision of performing a cell change from a serving cell to a target cell, transmitting of data to the serving cell before execution of the cell change, wherein the apparatus is configured to control transmission of packets to a user equipment during the cell change from the serving cell to the target cell,
wherein the serving cell is configured to receive information informing the serving cell on an intended cell change,
wherein the serving cell is configured to increase, in response to receipt of the information informing the serving cell on an intended cell change, a data rate of sending the data to the user equipment,
wherein the serving cell is configured to increase a scheduling priority for the user equipment which is subject to an imminent cell change so as to increase, in response to receipt of the information informing the serving cell on the intended cell change, the data rate of sending the data to the user equipment,
wherein the information informing the serving cell on the intended cell change is a scheduling priority indicator having a predetermined value,
wherein the change of said scheduling priority indicator to the predetermined value corresponds to reserving a scheduling priority indicator value for handover candidates, the scheduling priority for a handover candidate being increased upon receipt of the scheduling priority indicator having the predetermined value.

18. The apparatus according to claim 17, wherein the apparatus is configured to decide on an allowable flow of transmitting data to the serving cell, based on information fed back from the serving cell, and, in response to the decision of performing the cell change, to reduce a flow of the data to the serving cell below the allowable flow.

19. An apparatus comprising:
a receiver configured to receive information on an intended cell change to a target cell, wherein the apparatus is configured to transmit data to a user equipment; and
an increasing unit configured to increase, in response to receipt of the information on an intended cell change, a data rate of sending the data to the user equipment,
wherein the information on the intended cell change is a scheduling priority indicator having a predetermined value,
wherein the change of said scheduling priority indicator to the predetermined value corresponds to reserving a scheduling priority indicator value for handover candidates, the scheduling priority for a handover candidate being increased upon receipt of the scheduling priority indicator having the predetermined value.

20. The apparatus according to claim 19, wherein the apparatus includes a data buffer configured to store the data to be transmitted to the user equipment.

21. The apparatus according to claim 19, wherein the apparatus is configured to increase a scheduling priority for the user equipment which is subject to an imminent cell change so as to increase, in response to receipt of the information on the intended cell change, the data rate of sending the data to the user equipment.

22. The apparatus according to claim 19, wherein the information on the intended cell change is a radio link reconfiguration prepare message.

23. The apparatus according to claim 19, wherein the information on the intended cell change is a scheduling priority indicator having a predetermined value.

24. A computer program product, embodied on a computer-readable medium, including a program for a processing device, comprising software code portions for performing the following when the program is run on the processing device:
transmitting data, to be transmitted to the user equipment, to a serving cell first, and then transmitting the data from the serving cell to the user equipment;
executing a cell change so as to transmit, after the cell change, the data from the target cell to the user equipment after a decision of performing the cell change from the serving cell to a target cell; and
reducing or stopping the transmitting of the data to the serving cell, before execution of the cell change, in response to the decision of performing the cell change from the serving cell to the target cell,
wherein the serving cell increases a scheduling priority for the user equipment which is subject to an imminent cell change, so as to increase, in response to receipt of information informing the serving cell on the intended cell change, the data rate of sending the data to the user equipment,
wherein the information informing the serving cell on the intended cell change is a scheduling priority indicator having a predetermined value,
wherein the change of said scheduling priority indicator to the predetermined value corresponds to reserving a scheduling priority indicator value for handover candidates, the scheduling priority for a handover candidate being increased upon receipt of the scheduling priority indicator having the predetermined value.

25. The computer program product according to claim 24, wherein the program is directly loadable into an internal memory of the processing device.

26. A computer program product, embodied on a computer-readable medium, including a program for a network controller, comprising software code portions for performing, when the program is run on the network controller, the following:
reducing or stopping, in response to a decision of performing a cell change from a serving cell to a target cell, the transmitting of data to the serving cell before execution of the cell change;
deciding on an allowable flow of transmitting data to the serving cell, based on information fed back from the serving cell, and, in response to the decision of performing the cell change, to reduce a flow of the data to the serving cell below the allowable flow;
sending, to the serving cell, information informing the serving cell on an intended cell change, and generating, as the information, a scheduling priority indicator having a predetermined value reserved for indicating a cell change;
increasing a scheduling priority for the user equipment which is subject to an imminent cell change so as to increase, in response to receipt of the information informing the serving cell on the intended cell change, the data rate of sending the data to the user equipment,
wherein the change of said scheduling priority indicator to the predetermined value corresponds to reserving a scheduling priority indicator value for handover candidates, the scheduling priority for a handover candidate being increased upon receipt of the scheduling priority indicator having the predetermined value.

27. The computer program product according to claim 26, further comprising:
increasing, in response to receipt of information informing the serving cell on an intended cell change from the serving cell to a target cell, a data rate of sending data to a user equipment.

28. A system comprising:
transmitting means for transmitting data, to be transmitted to a user equipment, to a serving cell first, and then transmitting the data from the serving cell to the user equipment;
executing means for executing a cell change so as to transmit, after the cell change, the data from a target cell to the user equipment after a decision of performing the cell change from the serving cell to the target cell; and
increasing means for increasing, by the serving cell, in response to receipt of information informing the serving cell on an intended cell change, a data rate of sending the data to the user equipment,
wherein the serving cell increases a scheduling priority for the user equipment which is subject to an imminent cell change, so as to increase, in response to receipt of information informing the serving cell on the intended cell change, the data rate of sending the data to the user equipment,
wherein the information informing the serving cell on the intended cell change is a scheduling priority indicator having a predetermined value,
wherein the change of said scheduling priority indicator to the predetermined value corresponds to reserving a scheduling priority indicator value for handover candidates, the scheduling priority for a handover candidate being increased upon receipt of the scheduling priority indicator having the predetermined value.

* * * * *